(12) United States Patent
Choi

(10) Patent No.: US 12,166,199 B2
(45) Date of Patent: Dec. 10, 2024

(54) NEGATIVE ACTIVE MATERIAL FOR RECHARGEABLE LITHIUM BATTERY AND RECHARGEABLE LITHIUM BATTERY INCLUDING SAME

(71) Applicant: Samsung SDI Co., Ltd., Yongin-si (KR)

(72) Inventor: Hee Seon Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 248 days.

(21) Appl. No.: 17/170,436

(22) Filed: Feb. 8, 2021

(65) Prior Publication Data
US 2021/0249648 A1 Aug. 12, 2021

(30) Foreign Application Priority Data
Feb. 10, 2020 (KR) .................. 10-2020-0015754

(51) Int. Cl.
*H01M 4/36* (2006.01)
*H01M 4/38* (2006.01)
(Continued)

(52) U.S. Cl.
CPC ........... *H01M 4/364* (2013.01); *H01M 4/366* (2013.01); *H01M 4/386* (2013.01); *H01M 4/587* (2013.01);
(Continued)

(58) Field of Classification Search
None
See application file for complete search history.

(56) References Cited

U.S. PATENT DOCUMENTS

2005/0233213 A1* 10/2005 Lee ............... H01M 4/0402
423/325
2007/0105017 A1* 5/2007 Kawase ............ H01M 10/0525
252/182.1
(Continued)

FOREIGN PATENT DOCUMENTS

EP 3131140 A1 2/2017
EP 3246974 A1 11/2017
(Continued)

OTHER PUBLICATIONS

JP-2002260658-A English translation (Year: 2002).*
(Continued)

*Primary Examiner* — Lucas J. O'Donnell
(74) *Attorney, Agent, or Firm* — Lewis Roca Rothgerber Christie LLP

(57) ABSTRACT

A negative active material for a rechargeable lithium battery includes at least one particle selected from a composite crystalline carbon particle (A) including a crystalline carbon core and an amorphous carbon coating layer surrounding the crystalline carbon core; a composite crystalline carbon-silicon particle (B) including a mixed core of a crystalline carbon and silicon and an amorphous carbon coating layer surrounding the mixed core; and a composite silicon particle (C) including a silicon core and an amorphous carbon coating layer surrounding the silicon core, wherein the at least one particle has convexity in a range of about 0.85 to about 0.97 and circularity in a range of about 0.74 to about 0.90.

16 Claims, 3 Drawing Sheets

(51) Int. Cl.
  *H01M 4/587* (2010.01)
  *H01M 10/0525* (2010.01)
  *H01M 4/02* (2006.01)

(52) U.S. Cl.
  CPC .................. *H01M 10/0525* (2013.01); *H01M 2004/021* (2013.01); *H01M 2004/027* (2013.01)

(56) References Cited

U.S. PATENT DOCUMENTS

| | | |
|---|---|---|
| 2015/0194668 A1 | 7/2015 | Ueda et al. |
| 2017/0084913 A1* | 3/2017 | Misaki .................. H01M 4/587 |
| 2017/0187041 A1 | 6/2017 | Yamada et al. |
| 2018/0013146 A1 | 1/2018 | Yamada et al. |
| 2018/0040875 A1 | 2/2018 | Kim et al. |
| 2019/0312257 A1 | 10/2019 | Ishiwatari et al. |
| 2019/0363348 A1 | 11/2019 | Kurita et al. |
| 2020/0164479 A1 | 5/2020 | Cormier et al. |
| 2022/0367864 A1* | 11/2022 | Park ...................... H01M 4/131 |

FOREIGN PATENT DOCUMENTS

| | | | |
|---|---|---|---|
| EP | 3512010 A1 | 7/2019 | |
| JP | 2002260658 A * | 9/2002 | .......... H01M 10/052 |
| JP | 2007-128766 A | 5/2007 | |
| KR | 10-2015-0058205 A | 5/2015 | |
| KR | 10-2016-0113981 A | 10/2016 | |
| KR | 10-2017-0030580 A | 3/2017 | |

OTHER PUBLICATIONS

EPO Extended European Search Report dated Jun. 28, 2021, issued in corresponding European Patent Application No. 21155742.6 (9 pages).

* cited by examiner

NEGATIVE ACTIVE MATERIAL FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2020-0015754 filed in the Korean Intellectual Property Office on Feb. 10, 2020, the entire content of which is incorporated herein by reference.

BACKGROUND

1. Field

One or more embodiments of the present disclosure relate to a negative active material for a rechargeable lithium battery and a rechargeable lithium battery including same.

2. Description of the Related Art

Technology development for realizing high capacity of a rechargeable lithium battery has been continuously conducted due to an increasing demand for a mobile equipment and/or a portable battery.

As an electrolyte of a rechargeable lithium battery, an organic solvent in which a lithium salt is dissolved has been used.

As a positive active material of a rechargeable lithium battery, a lithium-transition metal oxide having a structure capable of intercalating lithium ions, such as $LiCoO_2$, $LiMn_2O_4$, $LiNi_{1-x}Co_xO_2$ ($0<x<1$), and/or the like, has been used.

As a negative active material, Si-based active materials including Si and Sn, and/or various carbon-based materials including artificial graphite, natural graphite, and hard carbon, capable of intercalating and deintercalating lithium ions, have been used. In recent years, high capacity batteries have been required (or desired), particularly, high capacity per volume has been required (or desired), and high specific capacity of the negative electrode is needed (or desired), so that the studies for using a composite of silicon and carbon in the negative electrode have been undertaken. However, the composite of silicon and carbon has severe volume expansion during charge and discharge.

The above information disclosed in this Background section is only for enhancement of understanding of the background of the invention, and therefore it may contain information that does not form the prior art that is already known to a person of ordinary skill in the art.

SUMMARY

One or more aspects of one or more embodiments of the present disclosure are directed towards a negative active material for a rechargeable lithium battery exhibiting good adhesion to a current collector and having effective reduced volume expansion.

One or more embodiments provide a rechargeable lithium battery including the negative active material.

One or more embodiments provide a negative active material for a rechargeable lithium battery, including: at least one particle selected from a composite crystalline carbon particle (A) including a crystalline carbon core and an amorphous carbon coating layer surrounding the crystalline carbon core; a composite crystalline carbon-silicon particle (B) including a mixed core of a crystalline carbon and silicon and an amorphous carbon coating layer surrounding the mixed core; and a composite silicon particle (C) including a silicon core and an amorphous carbon coating layer surrounding the silicon core, wherein the at least one particle has convexity in a range of about 0.85 to about 0.97 and circularity in a range of about 0.74 to about 0.90.

In one or more embodiments, the negative active material may include the composite crystalline carbon particle (A) and the composite crystalline carbon-silicon particle B. Herein, the amount of the composite crystalline carbon particle (A) and the composite crystalline carbon-silicon particle (B) may be about 90 wt % to about 95 wt % based on the total weight of the negative active material.

The circularity of the at least one particle may be in a range of about 0.81 to about 0.84.

The convexity of the at least one particle may be in range of about 0.92 to about 0.94.

The composite crystalline carbon particle (A) may have a particle diameter of about 10.1 μm to about 13.6 μm. Furthermore, the composite crystalline carbon-silicon particle (B) may have a particle diameter of about 6 μm to about 8 μm, and the composite silicon particle (C) may have a particle diameter D50 of about 5 μm to about 8 μm.

An amount of the amorphous carbon in the amorphous carbon coating layer may be about 20 wt % to about 45 wt % based on the total weight of the negative active material.

The crystalline carbon may be natural graphite, artificial graphite, or a mixture thereof.

The negative active material may be prepared by: spray-drying a core liquid including the crystalline carbon core, the mixed core, or the silicon core to prepare a spray-dried product; mixing the spray-dried product with an amorphous carbon precursor to prepare a mixture; and heat-treating the mixture.

The spray-drying may be performed at about 70° C. to about 90° C. A solid content of the core liquid may be about 15 wt % to about 35 wt % based on the total weight of the core liquid.

According to one or more embodiments, a rechargeable lithium battery includes: a negative electrode including the negative active material; a positive electrode including a positive active material; and a non-aqueous electrolyte.

Other embodiments of the present disclosure are included in the following detailed description.

The negative active material for the rechargeable lithium battery according to one or more embodiments may exhibit good adherence to a current collector and may allow suppression of the volume expansion of the negative electrode during charging and discharging.

DETAILED DESCRIPTION

Hereinafter, embodiments are described in more detail.

However, these embodiments are for illustrative purposes only, and the present disclosure is not limited thereto and the scope of the present disclosure is defined by the following claims and their equivalents.

A negative active material for a rechargeable lithium battery according to one or more embodiments includes: at least one particle selected from a composite crystalline carbon particle (A) including a crystalline carbon core and an amorphous carbon coating layer surrounding the core; a composite crystalline carbon-silicon particle (B) including a mixed core of a crystalline carbon and silicon and an amorphous carbon coating layer surrounding the core; and a composite silicon particle (C) including a silicon core and an amorphous carbon coating layer surrounding the core. The particle may have convexity of about 0.85 to about 0.97, and circularity of about 0.74 to about 0.90.

For example, the negative active material according to one or more embodiments may include at least one of three types (or kinds) of a composite crystalline carbon particle (A) including a crystalline carbon core and an amorphous carbon coating layer surrounding the core; a composite crystalline carbon-silicon particle (B) including a mixed core of a crystalline carbon and silicon and an amorphous carbon coating layer around (e.g., surrounding) the core; and a composite silicon particle (C) including a silicon core and an amorphous carbon coating layer around (e.g., surrounding) the core.

Figure 4:
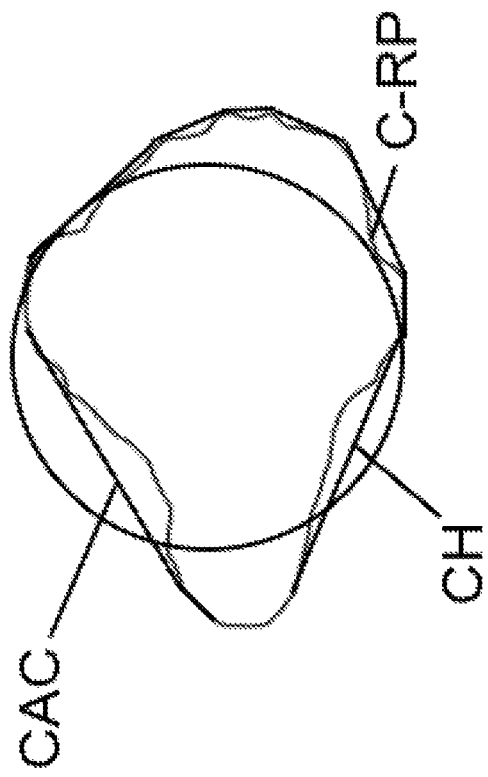
FIG. 4 is a schematic diagram representing how convexity is calculated.

In the specification, as shown, for example, in FIG. 4, the convexity may be obtained from a convex hull parameter CH and a surface roughness of the particle, and may be obtained by measuring a convex apparent circumference value (perimeter) CAC and a real circumference value C-RP, and determining the convex apparent circumference value/ the real circumference value. In one or more embodiments, the convexity may be in a range from 0 to 1. The convex apparent circumference value and the real circumference value may be obtained from a particle analyzer. For example, a 2D image of a particle is captured from a 3D image of particle using the particle analyzer, and then an area, a size, and a shape are determined therefrom.

In the negative active material, the convexity of the particle may be about 0.85 to about 0.97, or about 0.92 to about 0.94. When the convexity of the particle is within the range, adhesion to a current collector may be further improved and volume expansion during charging and discharging may be further reduced. If the convexity of the particle is lower than 0.85, the uniformity in the active material layer preparation is reduced and the curve generation may occur to reduce adhesion. The convexity of larger than 0.97 causes the active material layer to slip, which results in agglomeration of the active material.

Figure 3:
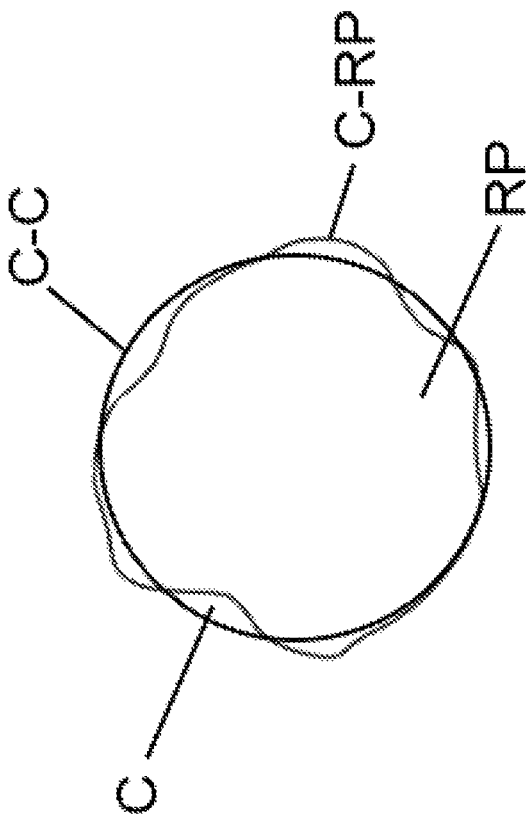
FIG. 3 is a schematic diagram representing how circularity is calculated.

The circularity refers to a degree to which the form of the particle approaches a substantially perfect circle, and refers to a ratio found by dividing the circumference C-C of the circle C with the same area as the real particle by the circumference C-RP of the real particle RP, as shown, for example, in FIG. 3. In one or more embodiments, the circularity may be in a range of 0 to 1. If circularity is 1, it indicates the perfect circle, and circularity of less than 1 indicates irregular materials (e.g., irregular shapes), wherein the closer the circularity is to 0, the more irregular the material (e.g., the less circular it is). The circularity may be obtained from the particle analyzer, similar to the convexity measurement.

The circularity of the particle of the negative active material according to one or more embodiments may be about 0.74 to about 0.90, or about 0.81 to about 0.84. When the circularity of the particle is within the range, the adhesion of the negative active material to the current collector may be further improved, and the volume expansion during charging and discharging may be further reduced. If the circularity of the particle is less than 0.74, the agglomeration in a preparation of a composition for preparing an active material layer may occur to cause difficulty of control of the viscosity and to reduce adhesion. If the circularity is more than 0.90, the agglomeration may occur.

Although the convexity and the circularity of the particle tend to be proportional, they are not the same value. That is, even when the convexity is 0.5, the circularity may not necessarily be 0.5, and although the convexities of the particles are the same, the circularities of the particles may be different from each other.

Figure 1:
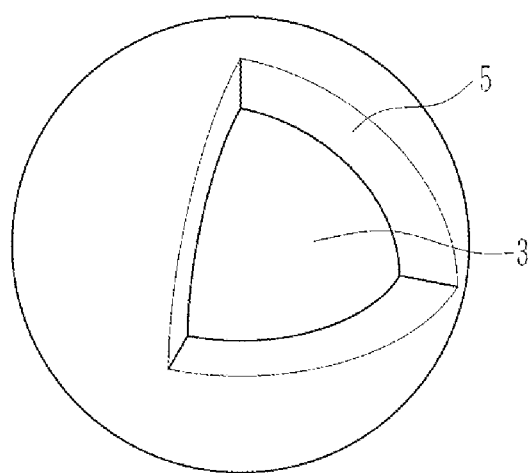
FIG. 1 is a schematic view of a negative active material according to one or more embodiments.
Figure 2:
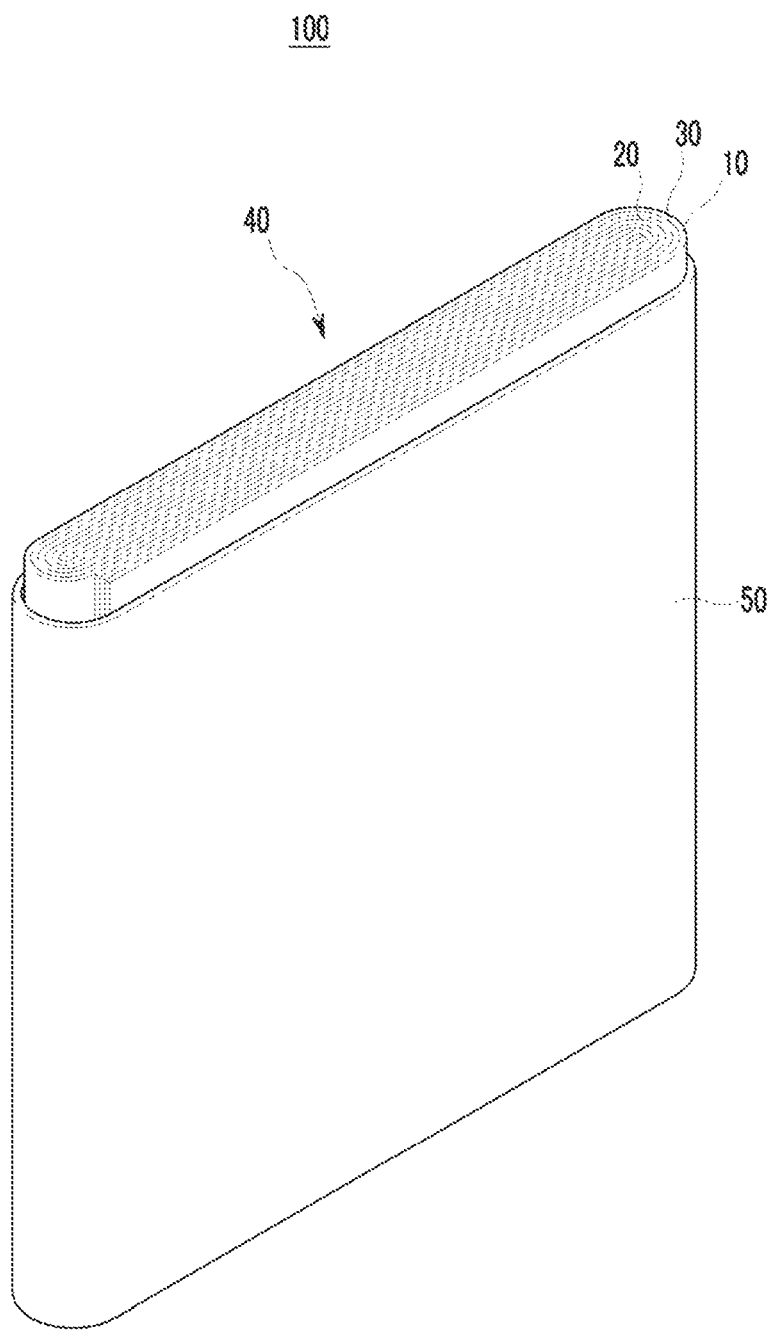
FIG. 2 is a schematic view of showing a structure of the negative active material according to one or more embodiments.

As shown in FIG. 1, the negative active material 1 according to one or more embodiments includes a core 3 and an amorphous carbon coating layer 5. As such, the negative active material according to one or more embodiments includes a core-shell structure including crystalline carbon, or a mixture of crystalline carbon and silicon as the core 3, and amorphous carbon as the coating layer 5, and has the predetermined (or set) convexity and circularity, for example, the specific particle shape. As the negative active material has the structure and particle shape according to the present embodiments, the adhesion to the current collector may be further improved and the volume expansion during charging and discharging may be further reduced.

In one or more embodiments, the composite crystalline carbon particle (A), for example, the composite crystalline carbon particle including a crystalline carbon core and an amorphous carbon coating layer surrounding the core, may have a particle diameter of about 10.1 μm to about 13.6 μm. The composite crystalline carbon-silicon particle (B), for example, the composite crystalline carbon-silicon particle including a mixed core of crystalline carbon and silicon, and an amorphous carbon coating layer surrounding the core, may have a particle diameter of about 6 μm to about 8 μm. The composite silicon particle (C), for example, the composite silicon particle including a silicon core and an amorphous carbon coating layer surrounding the core, may have a particle diameter of about 5 μm to about 8 μm.

The particle diameter may be an average particle diameter of particle diameters, and the average particle diameter may refer to a particle diameter D50 measured by a cumulative volume. As used herein, unless otherwise defined, the average particle diameter (D50) refers to a diameter of particles having a cumulative volume of 50% by volume in the particle size distribution.

The average particle size D50 may be measured by a suitable technique, e.g., using a particle size analyzer, transmission electron microscope photography, and/or scanning electron microscope photography. Another method may be performed by using a measuring device with dynamic light scattering, analyzing data to count a number of particles relative to each particle size, and then calculating to obtain an average particle diameter D50.

When the particle diameter of the composite crystalline particle (A), the composite crystalline carbon-silicon particle (B), or the composite silicon particle (C) respectively satisfy the above range, the adhesion of the negative active material to the current collector may be further improved and the volume expansion ratio during charging and discharging may be further reduced. If the particle diameter of the composite crystalline particle (A), the composite crystalline carbon-silicon particle (B), or the composite silicon particle (C) is out of the range of the present embodiments, severe volume expansion of the active material during charging and discharging may occur, the formation of the active material layer may be difficult, and the adhesion of the active material to the current collector may be deteriorated.

According to one or more embodiments, the negative active material may include the composite crystalline carbon particle (A) and the composite crystalline carbon-silicon particle (B). When the negative active material includes the composite crystalline carbon particle (A) and the composite crystalline carbon-silicon particle B, the cycle-life characteristic may be further improved.

An amount of the amorphous carbon included in the negative active material according to one or more embodiments may be about 20 wt % to about 45 wt % based on the total weight of the negative active material. When the amount of the amorphous carbon is within the range, the occurrence of unnecessary (or undesirable) side reaction of the negative active material with the electrolyte, and the electrochemical reaction due to charging and discharging, may be further effectively suppressed or reduced.

The amorphous carbon coating layer may have a thickness of about 100 nm to about 120 nm. When the thickness of the amorphous carbon coating layer is within the range, the reaction caused by the contact of the negative active material with the electrolyte may be further effectively suppressed (or reduced), and the electrochemical reaction may be further controlled.

An amount of the core may be about 55 wt % to about 80 wt %, based on the total weight of the particle. When the amount of the core is within the range, the reaction caused by the contact with the electrolyte may be further effectively suppressed (or reduced), and the electrochemical reaction may be further controlled.

The crystalline carbon may be natural graphite, artificial graphite, or a mixture thereof. The amorphous carbon may be soft carbon, hard carbon, mesophase pitch carbide, sintered coke, or a mixture thereof.

The negative active material may be prepared by spray-drying a core liquid including the core (e.g., core material) to prepare a spray-dried product, pulverizing the spray-dried product to prepare a pulverized product, mixing the pulverized product with an amorphous carbon precursor to prepare a mixture, and heat-treating the mixture. For example, the convexity and the circularity of the negative active material may be controlled according to the condition of the spray-drying process and an amount of solid of the core liquid.

To illustrate the negative active material preparation in more detail, first, the core liquid including the core (e.g., core material) may be spray-dried to prepare a spray-dried product. The core liquid may be one in which the core is added to a solvent and herein, the solvent may be isopropyl alcohol, ethanol, methanol, or any combination thereof.

The core liquid may have a solid amount of about 15 wt % to about 35 wt % based on the total weight of the core liquid. When the amount of solid is within the range in the core liquid, the negative active material with the desired (or suitable) convexity and circularity may be prepared. If the amount of the solid is less than 15 wt %, the active material having an irregular shape may be prepared. If the amount of the solid is more than 35 wt %, the dispersion may be decreased to abruptly increase circularity.

The solid refers to a core, and the amount of the solid refers to an amount of the core.

The core may be crystalline carbon, a mixture of crystalline carbon and silicon, or silicon. If the mixture of crystalline carbon and silicon is used as the core, the mixing ratio of crystalline carbon and silicon may be about 70:30 to about 90:10 by weight ratio.

If the core is crystalline carbon, a particle diameter of the crystalline carbon may be about 10 μm to about 13 μm. If the core is a mixture of crystalline carbon and silicon, a particle diameter of the core may be about 5 μm to about 19 μm, and herein, a particle diameter of crystalline carbon may be about 4 μm to about 10 μm, and a particle diameter of silicon may be about 3 μm to about 7 μm. Furthermore, if the core is silicon, a particle diameter of the silicon may be about 4 μm to about 7 μm.

The spray-drying may be performed at about 70° C. to about 90° C. When the spray-drying is performed at the above temperature range, a negative active material with the desired convexity and circularity may be prepared. If the spray-drying is performed at lower than 70° C., the surface roughness of the resulting product may be decreased, and resultantly, the convexity may be significantly enlarged, and if the spray-drying is performed at higher than 90° C., the shape of the product may be transformed.

The obtained spray-dried product may be pulverized to prepare a pulverized product. The pulverizing may be a ball mill process, and may be performed until the final active material with the desired size is obtained.

The pulverized product is mixed with an amorphous carbon precursor to prepare a mixture. The mixing ratio of the pulverized product and the amorphous carbon precursor may be controlled until a mixing ratio of the core and the amorphous carbon coating layer is about 80:20 to about 55:45 by weight ratio in the final negative active material.

The amorphous carbon precursor may be a petroleum-based coke, a coal-based coke, a green coke, coal pitch, mesophase pitch, petroleum pitch, a coal-based oil, a petroleum-based heavy oil, or a polymer resin such as a phenol resin, a furan resin, a polyimide resin, etc., or a combination thereof.

Thereafter, the mixture is heat treated. The heat-treatment may be performed at about 600° C. to about 950° C., and may be performed for about 5 hours to about 10 hours. The heat-treatment may be performed under an inert atmosphere, and the inert atmosphere may be nitrogen gas, argon gas, or a combination thereof. According to one or more embodiments, the inert atmosphere may be a nitrogen gas atmosphere.

Owing to the heat treatment, the amorphous carbon precursor may be converted to an amorphous carbon, and then form a surface of the pulverized product as an amorphous carbon coating layer. Resultantly, a negative active material in which the pulverized product is presented as a core, and an amorphous carbon coating layer is formed on a surface of the core, may be prepared.

After heat-treating, additional pulverization may be further performed in order to obtain an active material with the wanted size.

As such, when the negative active material preparation includes spray-drying at a specific temperature of the core liquid with the specific solid amount, and then an amorphous carbon coating layer is formed, a negative active material having the desired convexity and circularity may be prepared. If the amount of the solid in the core liquid, or the temperature condition for the spray-drying, does not satisfy the ranges, a negative active material with the desired convexity and circularity may not be prepared.

According to one or more embodiments, a rechargeable lithium battery including a negative electrode, a positive electrode, and an electrolyte is provided.

The negative electrode may include a current collector and a negative active material layer formed on the current collector.

In the negative active material layer, the negative active material may be included in an amount of 95 wt % to 99 wt % based on the total weight of the negative active material layer.

If the negative active material layer includes the composite crystalline carbon particle (A) and the composite crystalline carbon-silicon particle (B) as the negative active material, the amount thereof may be about 90 wt % to about 95 wt % based on the total weight of the negative active material layer.

The negative active material layer may include a binder, and may further optionally include a conductive material. In the negative active material layer, an amount of the binder may be about 1 wt % to about 5 wt % based on the total weight of the negative active material layer. When the negative active material layer further includes a conductive material, the negative active material layer includes about 90 wt % to about 98 wt % of the negative active material, about 1 wt % to about 5 wt % of the binder, and about 1 wt % to about 5 wt % of the conductive material.

The binder adheres negative active material particles to each other well (or suitably), and also adheres negative active material to the current collector. The binder may include a non-water-soluble binder, a water-soluble binder, or a combination thereof.

The non-water-soluble binder may be polyvinyl chloride, carboxylated polyvinylchloride, polyvinylfluoride, an ethylene oxide-included polymer, polyvinyl pyrrolidone, polyurethane, polytetrafluoroethylene, polyvinylidene fluoride, polyethylene, polypropylene, polyamideimide, polyimide, lithium polyacrylate, or a combination thereof.

The water-soluble binder may be a styrene-butadiene rubber, an acrylated styrene-butadiene rubber, an acrylonitrile-butadiene rubber, an acryl rubber, a butyl rubber, a fluorine rubber, an ethylene oxide-including polymer, polyvinyl pyrrolidone, polyepichlorohydrin, polyphosphazene, an ethylene propylene copolymer, polyvinyl pyridine, chloro sulfonate polyethylene, latex, a polyester resin, an acryl resin, a phenol resin, an epoxy resin, polyvinyl alcohol, or a combination thereof.

When the water-soluble binder is used as a negative electrode binder, a cellulose-based compound may be further used to provide viscosity as a thickener. The cellulose-based compound includes one or more of carboxymethyl cellulose, hydroxypropyl methyl cellulose, methyl cellulose, or alkali metal salts thereof. The alkali metals may be Na, K, or Li. The thickener may be included in an amount of 0.1 parts by weight to 3 parts by weight based on 100 parts by weight of the negative active material.

The conductive material is included to provide electrode conductivity, and any suitable electrically conductive material may be used as a conductive material, unless it causes a chemical change in the battery. Examples of the conductive material include a carbon-based material such as natural graphite, artificial graphite, carbon black, acetylene black, ketjen black, denka black, a carbon fiber, and/or the like; a metal-based material of a metal powder or a metal fiber including copper, nickel, aluminium, silver, and/or the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof, but is not limited thereto.

The positive electrode may include a positive current collector and a positive active material layer formed on the positive current collector.

The positive active material may include compounds that reversibly intercalate and deintercalate lithium ions (lithiated intercalation compounds or lithium intercalation compounds). For example, the positive active material may include one or more composite oxides of lithium and a metal selected from cobalt, manganese, nickel, and a combination thereof. For example, the positive active material compounds may be represented by one of the following chemical formulae. $Li_aA_{1-b}XbD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0≤α≤2); $Li_aNi_{1-b-c}Co_bX_cO_{2-\alpha}T_\alpha$ (0.90≤a≤1.8, 0≤b≤0.5, 0≤c≤0.05, 0≤α≤2); $Li_aNi_{1-b-c}Co_bX_cO_{2-\alpha}T_2$ (0.90≤a≤1.8, 0≤b≤0.5, 0≤c≤0.05, 0≤α≤2); $Li_aNi_{1-b-c}Mn_bX_cD_\alpha$ (0.90≤a≤1.8, 0≤b≤0.5, 0≤c≤0.05, 0≤α≤2); $Li_aNi_{1-b-c}Mn_bX_cO_{2-\alpha}T_\alpha$ (0.90≤a≤1.8, 0≤b≤0.5, 0≤c≤0.05, 0≤α≤2); $Li_aNi_{1-b-c}Mn_bX_cO_{2-\alpha}T_2$ (0.90≤a≤1.8, 0≤b 0.5, 0≤c≤0.05, 0≤α ≤2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$(0.90≤a≤1.8, 0≤b≤10.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤5 g≤0.5); $QO_2$; $QS_2$; $LiQS_2$; $V_2O_5$; $LiV_2O_5$; $LiZO_2$; $LiNiVO_4$; $Li_{(3-f)}J_2P(O_4)_3$(0≤f≤2); $Li_{(3-f)}Fe_2 P(O_4)_3$ (0≤f≤2); and $Li_aFePO_4$ (0.90≤a≤1.8).

In the chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material, by using the coating element compound. For example, the method may include any suitable coating method such as spray coating, dipping, and/or the like.

In the positive electrode, an amount of the positive active material may be 90 wt % to 98 wt % based on the total weight of the positive active material layer.

In one or more embodiments, the positive active material layer may further include a binder and a conductive material. Herein, each amount of the binder and the conductive material may be about 1 wt % to about 5 wt %, respectively, based on a total amount of the positive active material layer.

The binder improves binding properties of positive active material particles with one another and with a current collector. Examples of the binder may be polyvinyl alcohol, carboxymethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but are not limited thereto.

The conductive material is included to provide electrode conductivity. Any suitable electrically conductive material may be used as a conductive material, unless it causes a chemical change in a battery. Non-limiting examples of the conductive material include a carbon-based material such as natural graphite, artificial graphite, carbon black, acetylene black, ketjen black, a carbon fiber, and/or the like; a metal-based material of a metal powder or a metal fiber including copper, nickel, aluminium, silver, and/or the like; a conductive polymer such as a polyphenylene derivative; or a mixture thereof.

The current collector may be an aluminum foil, a nickel foil, or a combination thereof, but is not limited thereto.

The electrolyte may include a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, and/or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, t-butyl acetate, methylpropionate, ethylpropionate, propylpropionate, γ-butyrolactone, decanolide, valerolactone, mevalonolactone, caprolactone, and/or the like. The ether-based solvent may include dibutyl ether, tetraglyme, diglyme, dimethoxyethane, 2-methyltetrahydrofuran, tetrahydrofuran, and/or the like. The ketone-based solvent may include cyclohexanone and/or the like. The alcohol-based solvent may include ethanol, isopropyl alcohol, and/or the like, and the aprotic solvent may include nitriles such as R—CN (wherein R is a hydrocarbon group having a C2 to C20 linear, branched, or cyclic structure and may include a double bond, an aromatic ring, and/or an ether bond), and/or the like, dioxolanes such as 1,3-dioxolane and/or the like, and sulfolanes and/or the like.

The non-aqueous organic solvent may be used alone or in a mixture. When the organic solvent is used in a mixture, the mixture ratio may be controlled in accordance with a desirable battery performance.

When the non-aqueous organic solvent is used in a mixture, a mixed solvent of a cyclic carbonate and a chain (e.g., linear) carbonate; a mixed solvent of a cyclic carbonate and a propionate-based solvent; or a mixed solvent of a cyclic carbonate, a chain carbonate, and a propionate-based solvent may be used. The propionate-based solvent may be methyl propionate, ethyl propionate, propyl propionate, or a combination thereof.

In one or more embodiments, when the cyclic carbonate and the chain carbonate, or the cyclic carbonate and the propionate-based solvent, are mixed, they may be mixed in a volume ratio of about 1:1 to about 1:9, and thus performance of an electrolyte solution may be improved. When the cyclic carbonate, the chain carbonate, and the propionate-based solvent are mixed, they may be mixed in a volume ratio of about 1:1:1 to about 3:3:4. The mixing ratios of the solvents may be appropriately adjusted according to desirable properties.

The organic solvent may further include an aromatic hydrocarbon-based organic solvent, in addition to the carbonate-based solvent. Herein, the carbonate-based solvent and the aromatic hydrocarbon-based organic solvent may be mixed in a volume ratio of about 1:1 to about 30:1.

The aromatic hydrocarbon-based organic solvent may be an aromatic hydrocarbon-based compound of Chemical Formula 1:

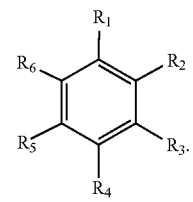

Chemical formula 1

In Chemical Formula 1, $R_1$ to $R_6$ are the same or different and are each independently selected from hydrogen, a halogen, a C1 to C10 alkyl group, a haloalkyl group, and a combination thereof.

Specific non-limiting examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound represented by Chemical Formula 2 as an additive for improving the cycle-life of a battery:

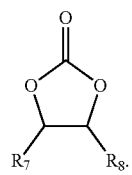

Chemical formula 2

In Chemical Formula 2, $R_7$ and $R_8$ are the same or different and are selected from hydrogen, a halogen, a cyano group (CN), a nitro group ($NO_2$), and a fluorinated C1 to C5 alkyl group, provided that at least one of $R_7$ and $R_8$ is a halogen, a cyano group (CN), a nitro group ($NO_2$), or a fluorinated C1 to C5 alkyl group, and both of $R_7$ and $R_8$ are not hydrogen.

Non-limiting examples of the ethylene carbonate-based compound may be difluoro ethylene carbonate, chloroethylene carbonate, dichloroethylene carbonate, bromoethylene carbonate, dibromoethylene carbonate, nitroethylene carbonate, cyanoethylene carbonate, and/or fluoroethylene carbonate. The amount of the additive for improving the cycle-life may be used within a suitable range.

The lithium salt dissolved in the organic solvent supplies lithium ions in a battery, enables a basic operation of a rechargeable lithium battery, and improves transportation of the lithium ions between positive and negative electrodes. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$(wherein x and y are a natural number, for example, an integer of 1 to 20), lithium difluoro(bisoxolato) phosphate, LiCl, LiI, $LiB(C_2O_4)_2$ (lithium bis(oxalato) borate: LiBOB), and lithium difluoro(oxalate) borate (LiD-FOB). The lithium salt may be used in a concentration ranging from about 0.1 M to about 2.0 M. When the lithium salt is included at the above concentration range, an electrolyte may have excellent (or improved) performance and lithium ion mobility due to optimal (or suitable) electrolyte conductivity and viscosity.

A separator may be disposed between the positive electrode and the negative electrode depending on a type (or kind) of the lithium secondary battery. Such separator may include polyethylene, polypropylene, polyvinylidene fluoride, and/or multi-layers thereof such as a polyethylene/polypropylene double-layered separator, a polyethylene/polypropylene/polyethylene triple-layered separator, a polypropylene/polyethylene/polypropylene triple-layered separator, and/or the like.

The drawing is an exploded perspective view of a lithium secondary battery according to one or more embodiments. The lithium secondary battery according to one or more embodiments is illustrated as a prismatic battery, but is not limited thereto, and may include variously (suitably) shaped batteries such as a cylindrical battery and/or a pouch battery.

Referring to the drawing, a lithium secondary battery 100 according to one or more embodiments includes an electrode assembly 40 manufactured by winding a separator 30 interposed between a positive electrode 10 and a negative electrode 20, and a case 50 housing the electrode assembly 40. The positive electrode 10, the negative electrode 20, and the separator 30 may be impregnated with an electrolyte solution.

Hereinafter, examples of the present disclosure and comparative examples are described. These examples, however, are not in any sense to be interpreted as limiting the scope of the invention.

Example 1

Natural graphite with an average particle diameter D50 of 10 µm was added to an isopropanol solvent to prepare a core liquid having an amount of solid of 25 wt %. The core liquid was spray-dried at 80° C. to prepare a spray-dried product.

The prepared spray-dried product was mixed with a petroleum pitch. The spray-dried product and the petroleum pitch was used until a mixing ratio of the natural graphite core and the amorphous carbon coating layer was a 70:30 weight ratio in the final negative active material.

The mixed product was heat-treated at 700° C. for 8 hours to prepare a negative active material including a natural graphite core and a soft carbon amorphous carbon coating layer.

Example 2

A negative active material was prepared by substantially the same procedure as in Example 1, except that natural graphite with an average particle diameter D50 of 13 µm was used.

Comparative Example 1

A negative active material was prepared by substantially the same procedure as in Example 1, except that natural graphite with an average particle diameter D50 of 25 µm was used, and the core liquid with the amount of the solid of 11 wt % was spray-dried at 80° C.

Comparative Example 2

A negative active material was prepared by substantially the same procedure as in Example 1, except that natural graphite with an average particle diameter D50 of 20 µm was used, and the core liquid with the amount of the solid of 25 wt % was spray-dried at 69° C.

Comparative Example 3

A negative active material was prepared by substantially the same procedure as in Example 1, except that natural graphite with an average particle diameter D50 of 16 µm was used, and the core liquid with the amount of the solid of 39 wt % was spray-dried at 80° C.

Comparative Example 4

A negative active material was prepared by substantially the same procedure as in Example 1, except that natural graphite with an average particle diameter D50 of 8 µm was used, and the core liquid with the amount of the solid of 13 wt % was spray-dried at 65° C.

Comparative Example 5

A negative active material was prepared by substantially the same procedure as in Example 1, except that natural graphite with an average particle diameter D50 of 8 µm was used, and the core liquid with the amount of the solid of 14 wt % was spray-dried at 80° C.

Reference Example 1

A negative active material was prepared by substantially the same procedure as in Example 1, except that natural graphite with an average particle diameter D50 of 8 µm was used, and the core liquid with the amount of the solid of 37 wt % was spray-dried at 100° C.

Comparative Example 6

A negative active material was prepared by substantially the same procedure as in Example 1, except that natural graphite with an average particle diameter D50 of 6 μm was used.

Comparative Example 7

A negative active material was prepared by substantially the same procedure as in Example 1, except that natural graphite with an average particle diameter D50 of 4 μm was used.

Comparative Example 8

A negative active material was prepared by substantially the same procedure as in Example 1, except that natural graphite with an average particle diameter D50 of 13 μm was used, and the core liquid with the amount of the solid of 13 wt % was spray-dried at 60° C.

Comparative Example 9

A negative active material was prepared by substantially the same procedure as in Example 1, except that natural graphite with an average particle diameter D50 of 13 μm was used, and the core liquid with the amount of the solid of 38 wt % was spray-dried at 100° C.

* Measurement of Average Particle Diameter D50 of Negative Active Material

Average particle diameter D50 of the negative active materials according to Examples 1 and 2, Comparative Examples 1 to 9, and Reference Example 1 were measured using a particle analyzer (Morphologi G3 available from Malvern Panalytical, Ltd.). The results are shown in Table 1.

* Convexity and Circularity Measurements

The convexity and the circularity of the negative active material according to each of Examples 1 and 2, Comparative Examples 1 to 9, and Reference Example 1 were measured by capturing a 2D image from a 3D particle image using a particle analyzer (Morphologi G3 available from Malvern Panalytical, Ltd.), and calculating areas, sizes, and shapes therefrom. The results are shown in Table 1.

* Fabrication of Half-Cells

Each negative active material according to Examples 1 and 2, Comparative Examples 1 to 9, and Reference Example 1 at 94 wt %, denka black at 3 wt %, and a polyvinylidene fluoride binder at 3 wt % were mixed in an N-methyl pyrrolidone solvent to prepare a negative active material slurry, and the slurry was coated on a Cu foil current collector, then dried and compressed to fabricate a negative electrode including a negative active material layer and a current collector.

Using the negative electrode, a lithium metal counter electrode, and an electrolyte, a half-cell with a 1C capacity of 3600 mAh was fabricated. As the electrolyte, 1.0M $LiPF_6$ dissolved in a mixed solvent of ethylene carbonate and diethyl carbonate (50:50 volume ratio) was used.

* Adhesion Measurement

In a negative electrode using the negative active material according to each of Examples 1 and 2, Comparative Examples 1 to 9, and Reference Example 1, the adhesion between the negative active material and the current collector was measured by adhering a double-sided tape attached to a slide glass to the negative electrode to produce a sample, and measuring the adhesion to the sample using a tester. The results are shown in Table 1.

* Expansion Rate Measurement

The fabricated half-cell was charge and discharged at 0.5C 50 times. After charging and discharging, the battery was disassembled to obtain the negative electrode, and a thickness thereof was measured. Thicknesses of the negative electrode before and after charging and discharging were measured, and the ratio of the thickness after the 50$^{th}$ round of charging and discharging to the thickness of the fabricated negative electrode before charging and discharging was determined. The results are shown in Table 1, as the expansion ratio.

TABLE 1

| | Average particle diameter of active material (D50, μm) | Convexity | Circularity | Adhesion (gf/mm) | Expansion ratio (%) |
|---|---|---|---|---|---|
| Comparative Example 1 | 27.1 | 0.84 | 0.74 | 0.73 | 26 |
| Comparative Example 2 | 21.7 | 0.98 | 0.79 | 0.85 | 28 |
| Comparative Example 3 | 18.3 | 0.98 | 0.83 | 0.92 | 27 |
| Comparative Example 4 | 15.5 | 0.82 | 0.77 | 0.82 | 26 |
| Comparative Example 5 | 15.5 | 0.84 | 0.77 | 1.12 | 23 |
| Reference Example 1 | 15.5 | 0.9 | 0.83 | 0.94 | 26 |
| Example 1 | 12.6 | 0.92 | 0.81 | 1.35 | 19 |
| Comparative Example 8 | 10.1 | 0.84 | 0.83 | 0.95 | 24 |
| Example 2 | 10.1 | 0.94 | 0.84 | 1.42 | 17 |
| Comparative Example 9 | 10.1 | 0.99 | 0.95 | 1.01 | 23 |
| Comparative Example 6 | 8.4 | 0.95 | 0.87 | 0.87 | 25 |
| Comparative Example 7 | 4.7 | 0.97 | 0.9 | 0.5 | No determination |

As shown by the results in Table 1, the half-cells using the negative active materials according to Examples 1 and 2, respectively having an average particle diameter D50 of 10.1 μm and 12.6 μm, convexity of 0.92 and 0.94, and circularity of 0.81 and 0.84 exhibited good adhesion of 1.35 gf/mm and 1.42 gf/mm, and low expansion ratios of 19% and 17%.

Meanwhile, the half-cell using the negative active material according to Reference Example 1, having the significantly larger average particle diameter (D50) of 15.5 μm, exhibited low adhesion of 0.90 gf/mm, and a high expansion ratio of 26%, regardless of the convexity and the circularity satisfying the recited ranges of 0.85 to 0.97, and 0.74 to 0.9, respectively. Furthermore, Comparative Examples 1 to 4, having very high average particle diameters D50 between 15.5 μm and 27.1 μm, and convexities outside of the recited range of 0.85 to 0.97, exhibited low adhesion between 0.73 gf/mm and 0.92 gf/mm and a high expansion ratio between 26% to 28%, even though the circularity was in the recited range of 0.74 to 0.90. Comparative Example 5 having circularity of 0.77, the average particle diameter D50 of 15.5 μm, and convexity of 0.84 exhibited proper adhesion of 1.12 gf/mm, but a high expansion ratio of 23%. Comparative Example 9, having very large convexity and circularity, had slight adhesion of 1.01 gf/m and a very high expansion ratio of 23%, even though the average particle diameter D50 was 10.1 μm.

Comparative Example 8, having small convexity of 0.84, exhibited slightly suitable adhesion of 0.95 gf/mm, but a high expansion ratio of 24%, even though the average particle diameter D50 was 10.1 μm and the circularity was 0.83.

Comparative Examples 6 and 7, using the negative active materials with the extremely low average particle diameter of 8.4 μm and 4.7 μm, respectively, exhibited low adhesion of 0.87 gf/mm and 0.5 gf/mm, and a high expansion ratio of 25%, even though the convexity and the circularity respectively satisfied the recited ranges of 0.85 to 0.97 and 0.74 to 0.9. Here, Comparative Example 7 was abruptly deteriorated such that expansion ratio could not be measured.

Example 3

A mixture of natural graphite with an average particle diameter D50 of 5 μm and silicon with an average particle diameter D50 of 4 μm (mixing ratio of natural graphite:silicon=80:20 by weight ratio, the average particle diameter of the mixture:6 μm) was added to an isopropanol solvent to prepare a core liquid having a solid amount of 25 wt %. The core liquid was spray-dried at 80° C. to prepare a spray-dried product.

The prepared spray-dried product was mixed with a petroleum pitch. The spray-dried product and the petroleum pitch was used until a mixing ratio of the natural graphite core and the amorphous carbon coating layer was 70:30 by weight ratio in the final negative active material.

The mixed product was heat-treated at 600° C. for 5 hours to prepare a negative active material including a mixed core of natural graphite and silicon and a soft carbon amorphous carbon coating layer.

Example 4

A negative active material was prepared by substantially the same procedure as in Example 3, except that a mixture of natural graphite with an average particle diameter D50 of 4 μm and silicon with an average particle diameter D50 of 3 μm (mixing ratio of natural graphite:silicon=80:20 by weight ratio, the average particle diameter of the mixture:5 μm) was used, and the core liquid with the solid amount of 25 wt % was spray-dried at 90° C.

Comparative Example 10

A negative active material was prepared by substantially the same procedure as in Example 3, except that a mixture of natural graphite with an average particle diameter D50 of 10 μm and silicon with an average particle diameter D50 of 4 μm (mixing ratio of natural graphite:silicon=80:20 by weight ratio, the average particle diameter of the mixture:12 μm) was used, and the core liquid with the solid amount of 14 wt % was spray-dried at 80° C.

Comparative Example 11

A negative active material was prepared by substantially the same procedure as in Example 3, except that a mixture of natural graphite with an average particle diameter D50 of 8 μm and silicon with an average particle diameter D50 of 4 μm (mixing ratio of natural graphite:silicon=80:20 by weight ratio, the average particle diameter of the mixture:10 μm) was used, and the core liquid with the solid amount of 11 wt % was spray-dried at 92° C.

Comparative Example 12

A negative active material was prepared by substantially the same procedure as in Example 3, except that a mixture of natural graphite with an average particle diameter D50 of 6 μm and silicon with an average particle diameter D50 of 4 μm (mixing ratio of natural graphite:silicon=80:20 by weight ratio, the average particle diameter of the mixture:8 μm) was used, and the core liquid with the solid amount of 18 wt % was spray-dried at 65° C.

Comparative Example 13

A negative active material was prepared by substantially the same procedure as in Example 3, except that a mixture of natural graphite with an average particle diameter D50 of 6 μm and silicon with an average particle diameter D50 of 4 μm (mixing ratio of natural graphite:silicon=80:20 by weight ratio, the average particle diameter of the mixture:8 μm) was used, and the core liquid with the solid amount of 37 wt % was spray-dried at 65° C.

Comparative Example 14

A negative active material was prepared by substantially the same procedure as in Example 3, except that a mixture of natural graphite with an average particle diameter D50 of 5 μm and silicon with an average particle diameter D50 of 4 μm (mixing ratio of natural graphite:silicon=80:20 by weight ratio, the average particle diameter of the mixture:6 μm) was used, and the core liquid with the solid amount of 17 wt % was spray-dried at 60° C.

Comparative Example 15

A negative active material was prepared by substantially the same procedure as in Example 3, except that a mixture of natural graphite with an average particle diameter D50 of 5 μm and silicon with an average particle diameter D50 of 4 μm (mixing ratio of natural graphite:silicon=80:20 by weight ratio, the average particle diameter of the mixture:6 μm) was used, and the core liquid with the solid amount of 38 wt % was spray-dried at 80° C.

Comparative Example 16

A negative active material was prepared by substantially the same procedure as in Example 3, except that a mixture of natural graphite with an average particle diameter D50 of 5 μm and silicon with an average particle diameter D50 of 4 μm (mixing ratio of natural graphite:silicon=80:20 by weight ratio, the average particle diameter of the mixture:6 μm) was used, and the core liquid with the solid amount of 37 wt % was spray-dried at 97° C.

Comparative Example 17

A negative active material was prepared by substantially the same procedure as in Example 3, except that a mixture of natural graphite with an average particle diameter D50 of 4 μm and silicon with an average particle diameter D50 of 4 μm (mixing ratio of natural graphite:silicon=80:20 by weight ratio, the average particle diameter of the mixture:5 μm) was used, and the core liquid with the solid amount of 17 wt % was spray-dried at 60° C.

Reference Example 2

A negative active material was prepared by substantially the same procedure as in Example 3, except that a mixture of natural graphite with an average particle diameter D50 of 3 μm and silicon with an average particle diameter D50 of 4 μm (mixing ratio of natural graphite:silicon=80:20 by weight ratio, the average particle diameter of the mixture:4 μm) was used, and the core liquid with the solid amount of 25 wt % was spray-dried at 80° C.

Reference Example 3

A negative active material was prepared by substantially the same procedure as in Example 3, except that a mixture of natural graphite with an average particle diameter D50 of 2 μm and silicon with an average particle diameter D50 of 4 μm (mixing ratio of natural graphite:silicon=80:20 by weight ratio, the average particle diameter of the mixture:3 μm) was used, and the core liquid with the solid amount of 25 wt % was spray-dried at 80° C.

* Measurement of Average Particle Diameter D50 of Negative Active Material

Average particle diameter D50 of the negative active materials according to Examples 3 and 4, Comparative Examples 10 to 17, and Reference Examples 2 and 3 were measured using a particle analyzer (Morphologi G3 available from Malvern Panalytical, Ltd.). The results are shown in Table 2.

* Convexity and Circularity Measurements

The convexity and the circularity of the negative active material according to Examples 3 and 4, Comparative Examples 10 to 17, and Reference Examples 2 and 3 were measured by capturing a 2D image from a 3D particle image using a particle analyzer (Morphologi G3 available from Malvern Panalytical, Ltd.), and calculating areas, sizes, and shapes therefrom. The results are shown in Table 2.

* Fabrication of Half-Cells

Each negative active material according to Examples 3 and 4, Comparative Examples 10 to 17, and Reference Examples 2 and 3 at 94 wt %, denka black at 3 wt % and a polyvinylidene fluoride binder at 3 wt % were mixed in an N-methyl pyrrolidone solvent to prepare a negative active material slurry, and the slurry was coated on a Cu foil current collector, and dried and compressed to fabricate a negative electrode including a negative active material layer and a current collector.

Using the negative electrode, a lithium metal counter electrode and an electrolyte, a half-cell with a 1C capacity of 3600 mAh was fabricated. As the electrolyte, 1.0M $LiPF_6$ dissolved in a mixed solvent of ethylene carbonate and diethyl carbonate (50:50 volume ratio) was used.

* Adhesion Measurement

In a negative electrode using the negative active material according to each of Examples 3 and 4, Comparative Examples 10 to 17, and Reference Examples 2 and 3, the adhesion between the negative active material and the current collector was measured by adhering a double-sided tape attached to a slide glass to the negative electrode to produce a sample, and measuring the adhesion to the sample using a tester. The results are shown in Table 2.

* Expansion Rate Measurement

The fabricated half-cell was charged and discharged at 0.5C 50 times. After charging and discharging, the battery was disassembled to obtain a negative electrode, and a thickness was measured. Thicknesses of the negative electrode before and after charging and discharging were measured, and the ratio of the thickness after the $50^{th}$ charging and discharging to the thickness of the fabricated negative electrode before charging and discharging was determined. The results are shown in Table 2, as the expansion ratio.

TABLE 2

| | Average particle diameter of active material (D50, μm) | Convexity | Circularity | Adhesion (gf/mm) | Expansion ratio (%) |
| --- | --- | --- | --- | --- | --- |
| Comparative Example 10 | 15.2 | 0.89 | 0.99 | 0.61 | 47 |
| Comparative Example 11 | 13.4 | 0.98 | 0.81 | 0.56 | 43 |
| Comparative Example 12 | 10.2 | 0.79 | 0.75 | 0.62 | 37 |
| Comparative Example 13 | 10.2 | 0.80 | 0.75 | 0.92 | 35 |
| Comparative Example 14 | 8.1 | 0.82 | 0.81 | 0.91 | 31 |
| Comparative Example 15 | 8.1 | 0.88 | 0.82 | 0.6 | 45 |
| Comparative Example 16 | 8.1 | 0.82 | 0.77 | 0.96 | 30 |
| Comparative Example 17 | 6.7 | 0.84 | 0.82 | 0.89 | 30 |
| Example 3 | 6.7 | 0.91 | 0.81 | 1.05 | 25 |
| Example 4 | 6.7 | 0.9 | 0.75 | 0.92 | 29 |
| Reference Example 2 | 5.1 | 0.93 | 0.78 | 0.67 | 33 |
| Reference Example 3 | 3.2 | 0.95 | 0.87 | 0.51 | 31 |

As shown by the results in Table 2, the half-cells using the negative active materials according to Examples 3 and 4, each having an average particle diameter D50 within a range of 6 μm to 8 μm, the convexity within the recited range of 0.85 and 0.97, and the circularity within the recited range of 0.74 to 0.9 exhibited good adhesion of 0.92 gf/mm and 1.05 gf/mm, and low expansion ratio of 25% and 29%, respectively.

Meanwhile, the half-cells using the negative active materials according to Comparative Examples 10 to 17 having at least one of the convexity and the circularity not satisfying the recited convexity range of 0.85 to 0.97 and/or the recited circularity of 0.74 to 0.9 exhibited low adhesion in a range of 0.56 gf/mm to 0.96 gf/mm, and high expansion ratio in a range of 30% to 47%.

Reference Examples 2 and 3 having very small average particle diameters D50 of 5.1 μm and 3.2 μm, respectively, exhibited low adhesion of 0.67 gf/mm and 0.51 gf/mm, and high expansion ratio of 33% and 31%, respectively, regardless of the convexity and the circularity being within the recited ranges of 0.85 and 0.97 (for convexity) and 0.74 to 0.9 (for circularity).

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

The term "and/or" includes one or more combinations which may be defined by relevant elements. Expressions such as "at least one of," "one of," and "selected from," when preceding a list of elements, modify the entire list of elements and do not modify the individual elements of the list. Further, the use of "may" when describing embodiments of the present disclosure refers to "one or more embodiments of the present disclosure."

As used herein, the terms "use," "using," and "used" may be considered synonymous with the terms "utilize," "utilizing," and "utilized," respectively.

In addition, the terms "substantially," "about," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this disclosure has been described in connection with what is presently considered to be one or more embodiments, it is to be understood that the disclosure is not limited to the disclosed embodiments. On the contrary, it is intended to cover various modifications and equivalent arrangements included within the spirit and scope of the appended claims and their equivalents.

What is claimed is:

1. A negative active material for a rechargeable lithium battery, the negative active material comprising:
   at least one particle selected from:
   a composite crystalline carbon particle (A) consisting of a crystalline carbon core and an amorphous carbon coating layer around the crystalline carbon core; and
   a composite crystalline carbon-silicon particle (B) comprising a mixed core of crystalline carbon and silicon and an amorphous carbon coating layer around the mixed core;
   wherein the at least one particle has a convexity of about 0.85 to about 0.97 and a circularity of about 0.74 to about 0.90,
   wherein the composite crystalline carbon particle (A) has an average particle diameter D50 of about 10.1 μm to about 13.6 μm; and
   wherein the composite crystalline carbon-silicon particle (B) has an average particle diameter D50 of about 6 μm to about 8 μm.

2. The negative active material of claim 1, wherein the negative active material comprises the composite crystalline carbon particle (A) and the composite crystalline carbon-silicon particle (B).

3. The negative active material of claim 1, wherein the negative active material comprises the composite crystalline carbon particle (A) and the composite crystalline carbon-silicon particle (B), and an amount of the composite crystalline carbon particle (A) and the composite crystalline carbon-silicon particle (B) is about 90 wt % to about 95 wt % based on a total weight of the negative active material.

4. The negative active material of claim 1, wherein the circularity of the at least one particle is about 0.81 to about 0.84.

5. The negative active material of claim 1, wherein the convexity of the at least one particle is about 0.92 to about 0.94.

6. The negative active material of claim 1, wherein amorphous carbon in the amorphous carbon coating layer is in an amount of about 20 wt % to about 45 wt % based on a total weight of the negative active material.

7. The negative active material of claim 1, wherein the at least one particle comprises the composite crystalline carbon particle (A) and crystalline carbon in the crystalline carbon core is natural graphite, artificial graphite, or a mixture thereof.

8. The negative active material of claim 1, wherein the negative active material is prepared by spray-drying a core liquid comprising the crystalline carbon core or the mixed core to prepare a spray-dried product;
   mixing the spray-dried product with an amorphous carbon precursor to prepare a mixture; and
   heat-treating the mixture.

9. The negative active material of claim 8, wherein the spray-drying is performed at about 70° C. to about 90° C.

10. The negative active material of claim 8, wherein a solid content of the core liquid is about 15 wt % to about 35 wt % based on a total weight of the core liquid.

11. A rechargeable lithium battery comprising:
    a negative electrode comprising the negative active material of claim 1;
    a positive electrode comprising a positive active material; and
    a non-aqueous electrolyte.

12. A method of forming the negative active material of claim 1, the method comprising:
    spray-drying a core liquid comprising the crystalline carbon core or the mixed core to prepare a spray-dried product;
    mixing the spray-dried product with an amorphous carbon precursor to prepare a mixture; and
    heat-treating the mixture.

13. The method of claim 12, wherein the spray-drying is performed at about 70° C. to about 90° C.

14. The method of claim 12, wherein a solid content of the core liquid is about 15 wt % to about 35 wt % based on a total weight of the core liquid.

15. A negative active material for a rechargeable lithium battery, the negative active material consisting of:
    a plurality of composite crystalline carbon particles (A) each consisting of a crystalline carbon core and an amorphous carbon coating layer around the crystalline carbon core, each of the composite crystalline carbon particles (A) having a convexity of about 0.85 to about 0.97 and a circularity of about 0.74 to about 0.90, and the plurality of composite crystalline carbon particles (A) having an average particle diameter D50 of about 10.1 μm to about 13.6 μm; or a plurality of composite crystalline carbon-silicon particles (B) each comprising a mixed core of crystalline carbon and silicon and an amorphous carbon coating layer around the mixed core, each of the composite crystalline carbon-silicon particles (B) having a convexity of about 0.85 to about 0.97 and a circularity of about 0.74 to about 0.90, and the plurality of composite crystalline carbon-silicon particles (B) having an average particle diameter D50 of about 6 μm to about 8 μm.

16. The negative active material of claim 15, wherein:

for the plurality of composite crystalline carbon particles (A), the crystalline carbon core has an average particle diameter D50 of about 10 μm to about 13 μm, and for the plurality of composite crystalline carbon-silicon particles (B), the crystalline carbon has an average particle diameter D50 of about 4 μm to about 10 μm and the silicon has an average particle diameter D50 of about 3 μm to about 7 μm.

* * * * *